(12) United States Patent
Major

(10) Patent No.: US 7,609,702 B2
(45) Date of Patent: Oct. 27, 2009

(54) INTERWORKING BETWEEN CELL AND PACKET BASED NETWORKS

(75) Inventor: Tamas Major, Düsseldorf (DE)

(73) Assignee: Nokia Corporation, Espoo (FI)

( * ) Notice: Subject to any disclaimer, the term of this patent is extended or adjusted under 35 U.S.C. 154(b) by 702 days.

(21) Appl. No.: 11/086,557

(22) Filed: Mar. 23, 2005

(65) Prior Publication Data

US 2006/0159102 A1    Jul. 20, 2006

(30) Foreign Application Priority Data

Jan. 18, 2005    (EP)    ................................. 05000916

(51) Int. Cl.
*H04L 12/28* (2006.01)
*H04J 3/16* (2006.01)
(52) U.S. Cl. .................................... 370/395.6; 370/466
(58) Field of Classification Search .............. 370/310.1, 370/310.2, 389, 392, 395.5, 395.6, 395.52, 370/401, 466
See application file for complete search history.

(56) References Cited

U.S. PATENT DOCUMENTS

| | | | |
|---|---|---|---|
| 5,526,349 A * | 6/1996 | Diaz et al. ................... | 370/392 |
| 6,393,025 B1 | 5/2002 | Merritt | |
| 6,539,011 B1 * | 3/2003 | Keenan et al. .............. | 370/352 |
| 6,603,766 B1 | 8/2003 | Zifroni et al. | |
| 6,625,171 B1 | 9/2003 | Matsudo | |
| 6,654,376 B1 | 11/2003 | Stacey et al. | |
| 6,738,384 B1 * | 5/2004 | Chung ......................... | 370/412 |
| 7,136,384 B1 * | 11/2006 | Wang ........................ | 370/395.1 |
| 7,139,271 B1 * | 11/2006 | Parruck et al. .............. | 370/392 |
| 7,248,604 B2 * | 7/2007 | Sugar et al. .................. | 370/468 |

(Continued)

FOREIGN PATENT DOCUMENTS

WO    WO 01/13599 A2    2/2001

(Continued)

OTHER PUBLICATIONS

ITU-T, Series I: Integrated Services Digital Network, Overall Network Aspects and Functions-Protocol Layer Requirements, "Segmentation and Reassembly Service Specific Convergence Sublayer for the AAL Type 2", I.366.1, Jun. 1998, pp. 1-30.

(Continued)

*Primary Examiner*—Hong Cho
(74) *Attorney, Agent, or Firm*—Mintz, Levin, Cohn, Ferris, Glovsky, and Popeo, P.C.

(57) ABSTRACT

A method and apparatus of communicating data between a cell based network and a packet based network. Received segments of data units are formed into new data segments which are transmitted irrespective of whether a complete data unit has been received. The received segments may be stored, used to form cells and/or transport packets, and transmitted to the cell based network or the packet based network. Also, conditions may be detected, such as timer expiration or a maximum reception capacity achieved, before the segments are used to form the cells and/or transport packets. Forming transport packets may comprise including segments belonging to a specific data unit in a transport packet and/or adding an indication of a specific data unit to which a segment belongs. These operations may be performed by a base station, an interworking unit, or a radio network controller.

28 Claims, 11 Drawing Sheets

U.S. PATENT DOCUMENTS

| | | | |
|---|---|---|---|
| 7,336,607 B2 * | 2/2008 | Samadi et al. ........... | 370/230.1 |
| 2002/0085564 A1 | 7/2002 | Lee | |
| 2004/0076179 A1 * | 4/2004 | Kaminski et al. ........... | 370/466 |
| 2004/0090949 A1 * | 5/2004 | So et al. ...................... | 370/352 |
| 2004/0213525 A1 * | 10/2004 | Pendse et al. ................. | 385/89 |
| 2005/0141509 A1 * | 6/2005 | Rabie et al. .............. | 370/395.1 |
| 2005/0157729 A1 * | 7/2005 | Rabie et al. ............ | 370/395.53 |

FOREIGN PATENT DOCUMENTS

WO     WO 03/067921 A1     8/2003

OTHER PUBLICATIONS

ITU-T, Series I: Integrated Services Digital Network, Overall Network Aspects and Functions-Protocol Layer Requirements, "*AAL Type 2 Service Specific Convergence Sublayer for Narrow-Band Services*", I.366.2, Nov. 2000, pp. 1-108; I.366.2, Corrigendum 1, Mar. 2002.

ITU-T, Series I: Integrated Services Digital Network, Overall Network Aspects and Functions-Protocol Layer Requirements, "*B-ISDN ATM Adaptation Layer Specification: Type 2 AAL*", I.363.2, Nov. 2000, pp. 1-52.

$3^{rd}$ *Generation Partnership Project; Technical Specification Group Radio Access Network; IP Transport in UTRAN (Release 5)*, 3GPP TR 25.933 v5.4.0, Dec. 2003, pp. 1-138.

"*$3^{rd}$ Generation Partnership Project (3GPP); Technical Specification Group Radio Access Network; UTRAN Iur and Iub Interface Data Transport & Transport Signalling for DCH Data Streams (Release 5)*", 3GPP TS 25.426 v5.6.0, Sep. 2004, pp. 1-13.

"*$3^{rd}$ Generation Partnership Project; Technical Specification Group Radio Access Network; UTRAN Iub and Interface NBAP Signalling (Release 4)*", 3GPP TS 25.433 v4.13.0, Sep. 2004, pp. 1-564.

B. Subbiah, et al., "User Multiplexing in RTP Payload Between IP Telephony Gateways," Internet Engineering Task Force, Aug. 21, 1998, pp. 1-17.

PCT International Search Report, International Application No. PCT/IB2005/003853, Date of Mailing: Mar. 24, 2006, pp. 1-4.

\* cited by examiner

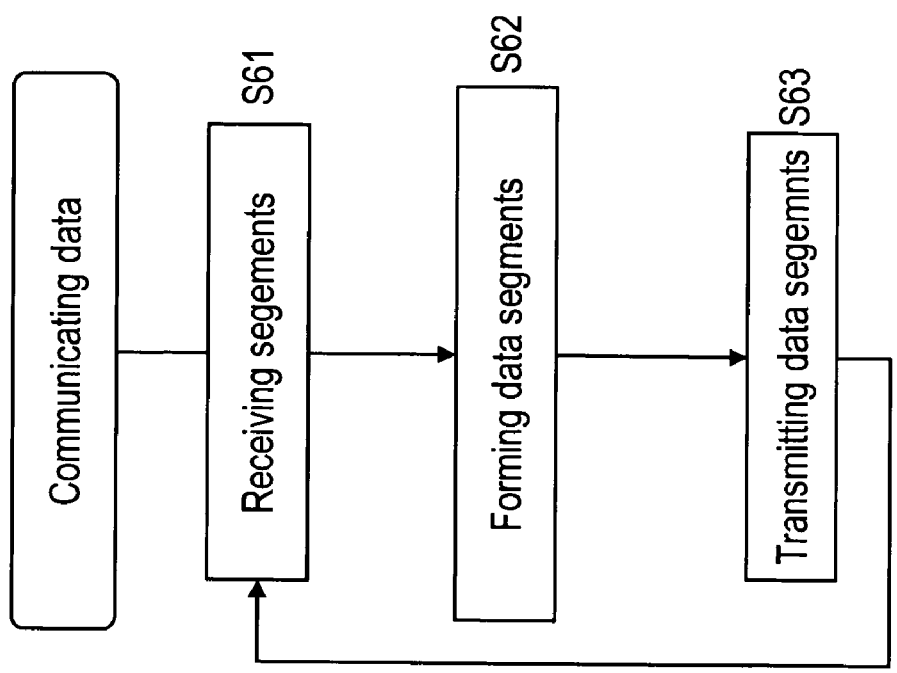

INTERWORKING BETWEEN CELL AND PACKET BASED NETWORKS

FIELD OF THE INVENTION

The present invention relates to a method and apparatus for communicating data in a communication network system. In particular, the present invention relates to transmitting data between cell and packet based networks.

BACKGROUND OF THE INVENTION

Within the Terrestrial Radio Access Network (UTRAN) of the Universal Mobile Telecommunication System (UMTS) the Iub interface is located between the Radio Network Controller (RNC) and the base stations (Node B). For the Iub interface, the Asynchronous Transfer Mode (ATM) and ATM Adaptation Layer type 2 (AAL2) are used for transporting Frame Protocol (FP) PDUs (Protocol Data Units).

Ethernet is becoming a reasonable alternative to cell based transport infrastructure. In case of Ethernet the Internet Protocol (IP) is seen as the most feasible network layer. A typical way to transport Iub traffic over IP is to transport FP PDU frames over UDP/IP.

Due to existing legacy systems, interworking between cell based protocols, e.g. ATM, and packet based protocols, e.g. IP, based nodes is required, e.g. between an ATM based RNC and an IP based Node B (base station, BTS). This functionality may be either located in explicit nodes (Interworking Unit, IWU) or be part of other network elements, like e.g. the RNC and Node Bs themselves. For user plane traffic those nodes terminate the AAL2 layer on the ATM interface and then send the received FP frames over UDP/IP (User Datagram Protocol/Internet Protocol) to the BTS and vice versa.

As shown in FIG. 11, Frame protocol (FP) PDUs, which are larger than 45 octets, are segmented by the AAL2 SSSAR (Service Specific Transmission and Reassembly Sublayer) into multiple, up to 45 octets long CPS (Common Part Sublayer) SDUs (Service Data Units). Each of those CPS SDUs is given a CPS header, and the complete CPS PDUs are then multiplexed into ATM cells.

FIG. 12 shows the format of an AAL2 CPS packet in greater detail. A CPS packet header (CPS-PH) comprises a Channel Identifier (CID) of eight bits identifying a user channel out of 256 channels, a Length Indicator (LI) of six bits indicating the length of a packet payload, a User-to-User Indication (UUI) of five bits as an SSCS (Service Specific Convergence Sublayer) specific indication, and a Header Error Control (HEC) of five bits serving for error detection in the CPS-PH. CPS-INFO represents the CPS packet payload (CPS-PP) comprising 1 to 45 bytes. Thus, a CPS packet may comprise 4 to 48 bytes.

In order to use the transport resources efficiently, each AAL2 connection might be shaped individually on a CPS packet basis before multiplexing it into ATM cells. Without shaping, the CPS packets are transmitted back-to-back as a burst whereas the shaping allows the transmission of the segments (i.e. CPS packets) with a finite inter-departure time. During the inter-departure time the CPS packets of other AAL2 connections using the same path may use the path capacity.

A node which is terminating the AAL2 layer and further processes the received AAL2 SDU normally has to wait until it has received all CPS packets for a complete AAL2 SDU. This is called "Store-and-forward" method, because first the complete AAL2 SDU must be received before it can be forwarded to the next processing layer. The time needed until the complete AAL2 SDU has been received depends on the shaping parameters, transport capacities and the size of the AAL2 SDUs.

Due to this "store-and-forward" method the delay imposed by an intermediate ATM/IP Interworking Unit (IWU) between the RNC and BTS, will be significantly increased, especially in case of large FP frames like for example those typical for HSDPA (High Speed Downlink Packet Access).

Another critical aspect for Iub is not only the total delay of the transport layer, but even more the delay variation the transport layer imposes. The frame protocol layer used on the Iub has the capability to adapt to the transport delay between RNC and BTS, but it still requires that the total delay remains within a given range. Thus, any larger variation will cause data losses. With ATM the delay variation remains small and is controllable, however, with a packet based transport network with intermediate nodes the delay is depending on the packet size, number of nodes, link capacity between the nodes and how large other packets are when they are blocking the link. Thus, the delay variation can become quite large.

Another drawback is that on the IP interfaces large UDP payload (more than 1472 bytes) is problematic, since due to the limited MTU (maximum transfer unit) size of Ethernet (1500 bytes) IP segmentation is required, which is a quite complicated and memory demanding functionality on the receiver side. In general, large packets are not recommended when the transport network consists of several nodes (e.g. IP routers, Ethernet switches) and low capacity links, because at each node the complete packet has to be received before it can be forwarded.

In addition, in case of small FP frames (e.g. voice frames), the overhead/payload ratio is poor if only a single small frame is transported within an IP packet, thus transport bandwidth will be wasted.

A prior art solution allows to multiplex small packets called "CIP" of variable size in one CIP container, also of variable size. This may allow an efficient use of the transport bandwidth by amortizing the IP/UDP overhead over several CIP packets.

A segmentation/re-assembly mechanism allows to split large FP PDUs in smaller segments, which will be the CIP packets. There has to be a trade-off between efficiency (IP header/payload ratio) and transmission delay. Large data packets have to be segmented in order to avoid IP fragmentation and to keep transmission delays low.

However, this solution assumes that the complete FP PDU is received before the frame is split into smaller segments.

SUMMARY OF THE INVENTION

It is an object of the present invention to improve interworking between a cell based network and a packet based network by reducing delay and delay variation and increasing transport efficiency.

According to an aspect of the invention, this object is achieved by a network entity for communicating data between a cell based network and a packet based network. The network entity comprises a receiving means for receiving segments of data units, a forming means for forming new data segments out of the segments of the data units, and a transmitting means for transmitting the new data segments, wherein the transmitting means is configured to transmit the new data segments irrespective of whether a complete data unit has been received.

The cell based network may comprise an ATM network, and the packet based network may comprises Ethernet.

When data is communicated in the direction from the packet based network to the cell based network, wherein the segments of data units received by the receiving means are distributed over a plurality of packets from the packet based network, a storing means of the network entity temporarily stores received segments, and the forming means of the network entity forms cells, wherein the transmitting means transmits the cells formed by the forming means to the cell based network.

When data is transmitted in the direction from the cell based network to the packet based network, wherein the segments of data units received by the receiving means are distributed over a plurality of cells from the cell based network, a storing means of the network entity temporarily stores received segments, and a forming means of the network entity forms transport packets, wherein the transmitting means transmits the packets formed by the forming means to the packet based network.

The network entity may further comprise a detecting means for detecting conditions to be fulfilled in order to build a transport packet out of the stored segments from the storing means.

The detecting means may, as one of the conditions, detect a timer expiration or detect that the number of received segments reaches a maximum size of the transport packets.

The network entity may further comprise a determining means for determining a maximum size of the transport packets, wherein the transport packets each may have the same maximum size.

The forming means may form the transport packets by including segments belonging to a specific data unit into different transport packets and/or by including segments belonging to different data units into one transport packet.

The forming means may also add an indication to the segments out of which the transport packet is formed, the indication indicating a specific data unit to which the segments belong.

The network entity may comprises at least one of a base station, an interworking unit and a radio network controller.

According to another aspect of the invention, the above object is achieved by a method of communicating data between a cell based network and a packet based network, the method comprising a receiving step of receiving segments of data units, a forming step of forming new data segments out of the segments of the data units, and a transmitting step of transmitting the new data segments, wherein the new data segments are transmitted irrespective of whether a complete data unit has been received.

The invention may also be implemented as computer program product for a computer, wherein the computer program product may comprise a computer-readable medium on which the software code portions are stored, or wherein the computer program product is directly loadable into an internal memory of the computer.

It is a benefit of the present invention that the processing delay within a network entity such as an Interworking Unit between a cell and packet based network is reduced, since it is not required that a complete higher layer SDU has to be received before a further processing can be started, and so reducing the introduced delay (so called "cut-through" processing).

Moreover, the packet based interfaces (e.g. IP and/or Ethernet) are used very efficiently by using an optimum overhead/payload ratio.

Furthermore, according to an embodiment of the invention, delay variation is reduced by using a fixed packet length.

Furthermore, according to the invention, large higher layer SDUs (e.g. from HSDPA traffic) can be transported over Ethernet, without the need for intermediate IP segmentation.

An additional advantage of the present invention is that due to the "cut-through" processing of higher layer SDUs less memory is required.

BRIEF DESCRIPTION OF THE DRAWINGS

FIG. 10 shows a flow diagram illustrating a process of forming data segments according to the present invention.

DESCRIPTION OF THE PREFERRED EMBODIMENTS

The main idea of the present invention is to use a "cut-through" processing instead of a "store-and-forward" mechanism between cell and packet based networks, where on the packet based interface several optimization methods are used for increasing efficiency and decreasing delay and delay variations.

In particular, the present invention is applicable to UMTS (Universal Mobile Telecommunications System) networks, specifically in the RAN (Radio Access Network) area, where a mixture of cell and packet based transmission technologies will be used.

Figure 11:
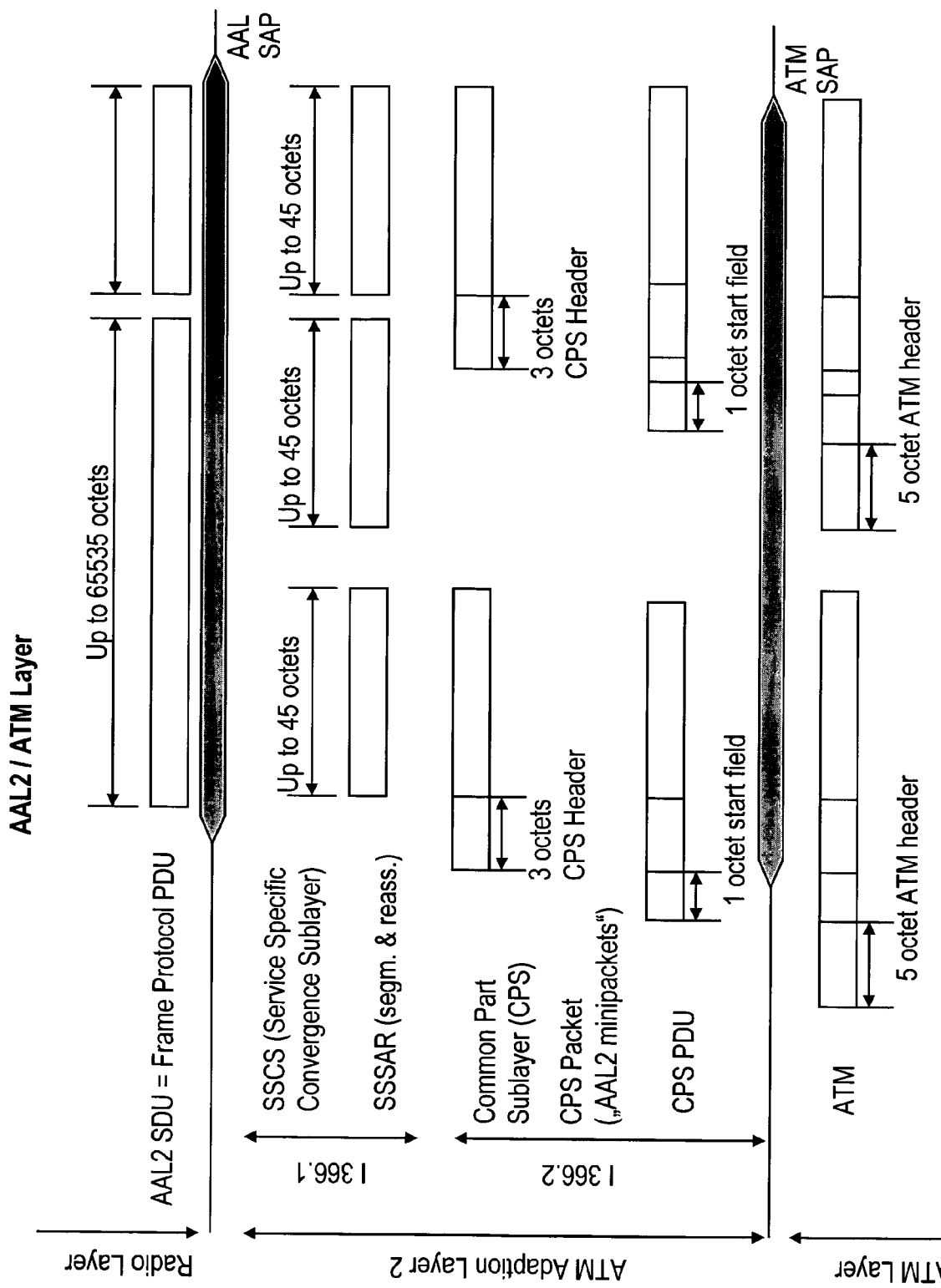
FIG. 11 illustrates processing performed in ATM Adaptation Layer 2.
Figure 12:
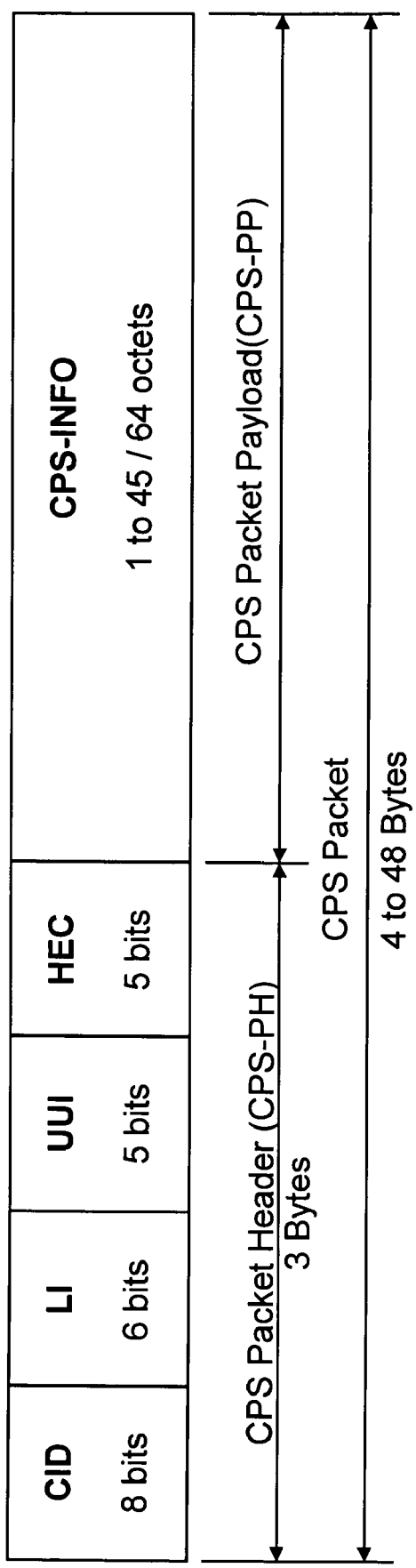
FIG. 12 illustrates a format of an AAL2 CPS packet.

In the context of the preferred embodiment a protocol data unit is a frame protocol (FP) PDU, which is equal to a higher layer SDU such as an AAL2 SDU (as shown also in FIG. 11). According to ATM, segments of a service data unit are SDUs created by the SSSAR sublayer of AAL2, which will be used for forming AAL2 CPS packets. A transport packet is a packet according to the protocol used in the packet based network, carrying segments of one or multiple frame protocol PDUs.

In order to keep the delay variation below a certain limit, it is beneficial when all packets have the same size. Further on in order to keep the transport delay small, especially in a multihop and/or low capacity packet based network, a reasonable maximum transport data packet size is calculated according to network properties, which all packets should have. The size calculation is also affected by the payload/packet size ratio (transport efficiency), which is decreasing with smaller packets sizes, because the transport overhead remains the same and only less payload is transported within the packet.

The actual data, which is transported over the packet based network, may have a variable size which may be much smaller than the reasonable maximum packet size or also much larger.

In the latter case, it is known to segment a large piece of data into several smaller chunks called "segments", where each of those will result in a packet having the maximum packet size, with the possible exception of the packet carrying the last segment.

If the piece of data is smaller, it is known to multiplex data from several connections into the same packet, so that the packet reaches the reasonable maximum packet size. If there is not enough data available to reach a target packet size with multiplexing, then the node is waiting until there is enough data available. This waiting time may be limited by an upper value, which is used to keep the introduced delay below a certain limit.

Thus, a new transport data packet is built together, when
a timer expires, or
the resulting transport packet size reaches a maximum transport packet size.

According to the present invention, data segments can be already transmitted before the complete (FP) PDU has been received, thus reducing the introduced transmission delay.

According to an implementation example to be described in the following referring to FIGS. 1 to 4 and 7,
a new segmentation/reassembly and multiplexing/demultiplexing layer is introduced between an application layer (e.g. Frame Protocol handler) and a transport layer (e.g. IP/UDP) in the BTS and on top of the transport layer in the IWU,
on a Service Access Point (SAP) between an AAL2 SSCS/SSSAR Layer (Segmentation and Reassembly Service Specific Convergence Sublayer) and an AAL2 user layer (e.g. Frame Protocol handler) also partial AAL2 SDUs can be exchanged, and
the size and content of the transport packet is determined according to link capacities, a delay budget, connection priorities, timer values per AAL2 connection, a Path MTU size (to avoid additional IP fragmentation), etc.

In particular, the present invention may be used beneficially in ATM/IP interworking units (IWU) where FP PDUs have to be transported over an IP network, especially when the delay issues are critical and the transport capacities in the IP network are low.

In such applications the maximum size for the IP transport packets has to be determined as a trade-off between transport efficiency (payload/packet size ratio) and transmission delay and delay variation.

Figure 1:
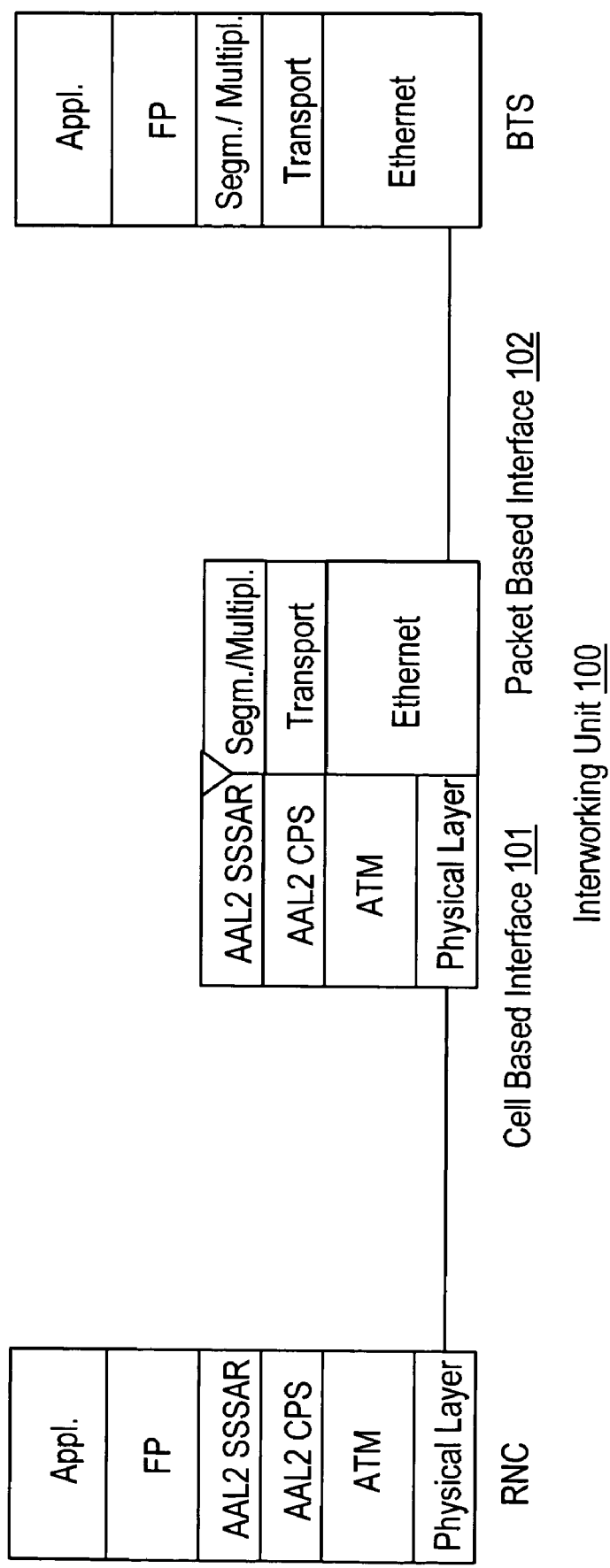
FIG. 1 illustrates an example protocol stack of a cell based/packet based Interworking Unit for user plane processing according to the present invention.

FIG. 1 illustrates an example protocol stack of a cell based (ATM)/packet based (Ethernet, optionally with IP) Interworking Unit (IWU) 100 for user plane processing according to the present invention. As shown in FIG. 1, a protocol stack at an ATM based RNC comprises an application layer on top, followed by a frame protocol layer FP, an AAL2 SSSAR layer, AAL2 CPS layer, ATM layer and physical layer. At a cell based interface 101 of the IWU 100 a protocol stack comprises the AAL2 SSSAR layer on top, followed by the AAL2 CPS layer, the ATM layer and the physical layer. At a packet based interface 102 of the IWU 100 a protocol stack comprises a segmentation/multiplexing and reassembly/demultiplexing layer (which is simply referred to as segmentation/multiplexing layer) on top of a transport layer, which is followed by an Ethernet layer. A protocol stack at a packet or Ethernet based BTS comprises the application layer on top followed by the FP layer, the segmentation/multiplexing layer, the transport layer and the Ethernet layer.

The transport layer shown in FIG. 1 may be IP/UDP or something proprietary. The segmentation/multiplexing layer is introduced on the Ethernet/IP interface of the IWU 100 and the BTS between the transport and FP (Frame Protocol) layers.

AAL2 CPS packets are received at the ATM interface of the IWU 100 and the CPS payload is put into a receive (reassembly) buffer according to the CID value in the CPS packet. According to the invention, data from this receive buffer can be used even before a complete AAL2 SDU (FP PDU, consisting of multiple AAL2 CPS packets) has been received. When some parts of the already received data of an AAL2 SDU (FP PDU) are used for further processing, then those can be already removed from the receive buffer.

On the packet-based interface of the IWU 100 (e.g. Ethernet), transport data packets are used. A transport data packet contains a transport header and data from one or multiple AAL2 connections, separated by multiplex headers.

Figure 2:
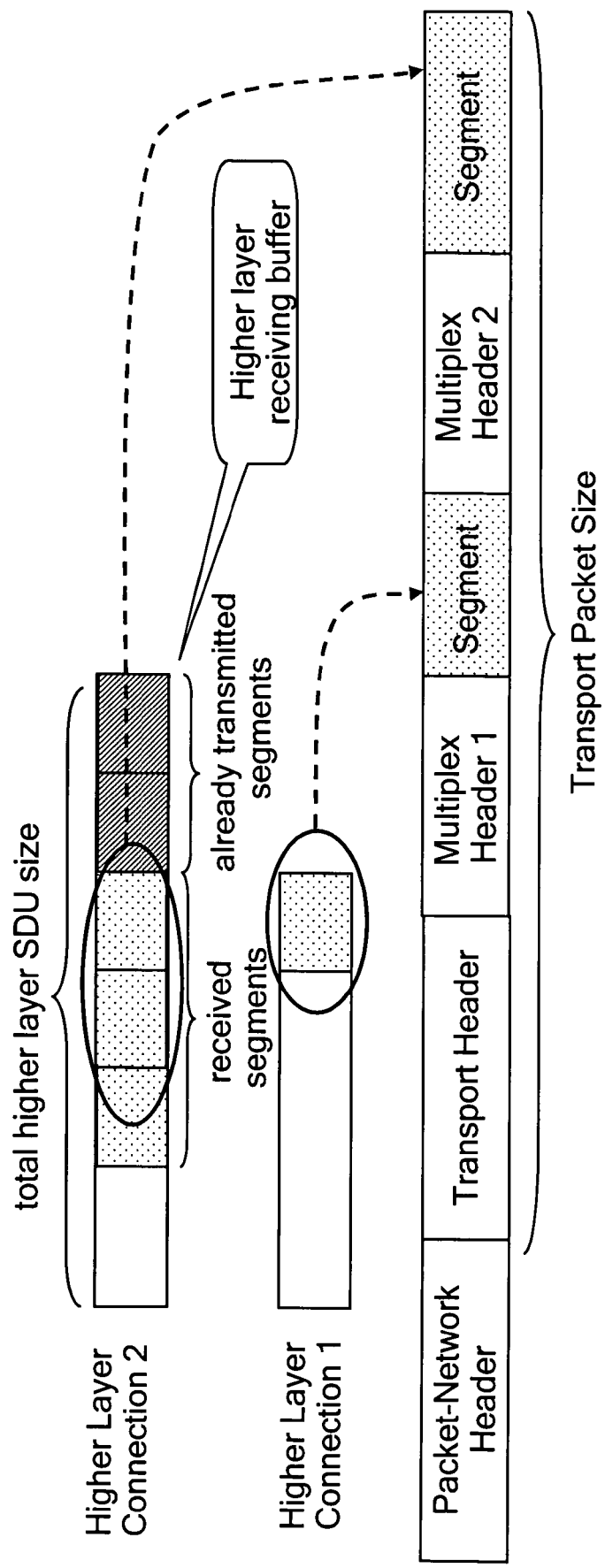
FIG. 2 illustrates a procedure of building transport packets using segments from higher layer SDUs from multiple higher layer connections according to an embodiment of the present invention.

FIG. 2 illustrates a procedure of building transport data packets using segments from FP PDUs from multiple higher layer connections (e.g. AAL2 connections) according to an embodiment of the present invention.

The transport header may be e.g. IP/UDP or some proprietary header, which can be used on top of Ethernet or any other packet based protocol.

As mentioned earlier, the multiplexed payload may contain either one or more complete FP PDUs or one or more segments. The multiplex header may contain a connection identifier, information about the length of the following multiplex payload and an indication whether this is the first or last segment of the initial FP PDU.

A new transport data packet is built together when a dedicated timer expires (limiting the introduced delay and ensuring continuous usage of resources) or when the resulting transport packet size has reached an upper limit.

If one of these conditions is fulfilled, then some or the complete amount of data is taken from the receive buffer of the AAL2 connection, the multiplex header is attached and then put into the new transport data packet. This may be done for one or multiple AAL2 connections, depending on several parameters like the initial trigger for sending out a transport packet (i.e. the above-mentioned conditions), the size of each segment and the priorities of the AAL2 connections.

Forming a new transport packet out of SSSAR PDUs as shown in FIG. 2, a segment of received data of an AAL2 connection 1 is included in the new transport packet with multiplex header 1, and a segment of received data of an AAL2 connection 2 is included with multiplex header 2 into the new transport packet to be formed. The new transport packet consists of a transport header plus the segment with the associated multiplex header 1 plus the segment with the associated multiplex header 2. The transport packet is further provided with a header corresponding to the used packet network, e.g. Ethernet.

Figure 3:
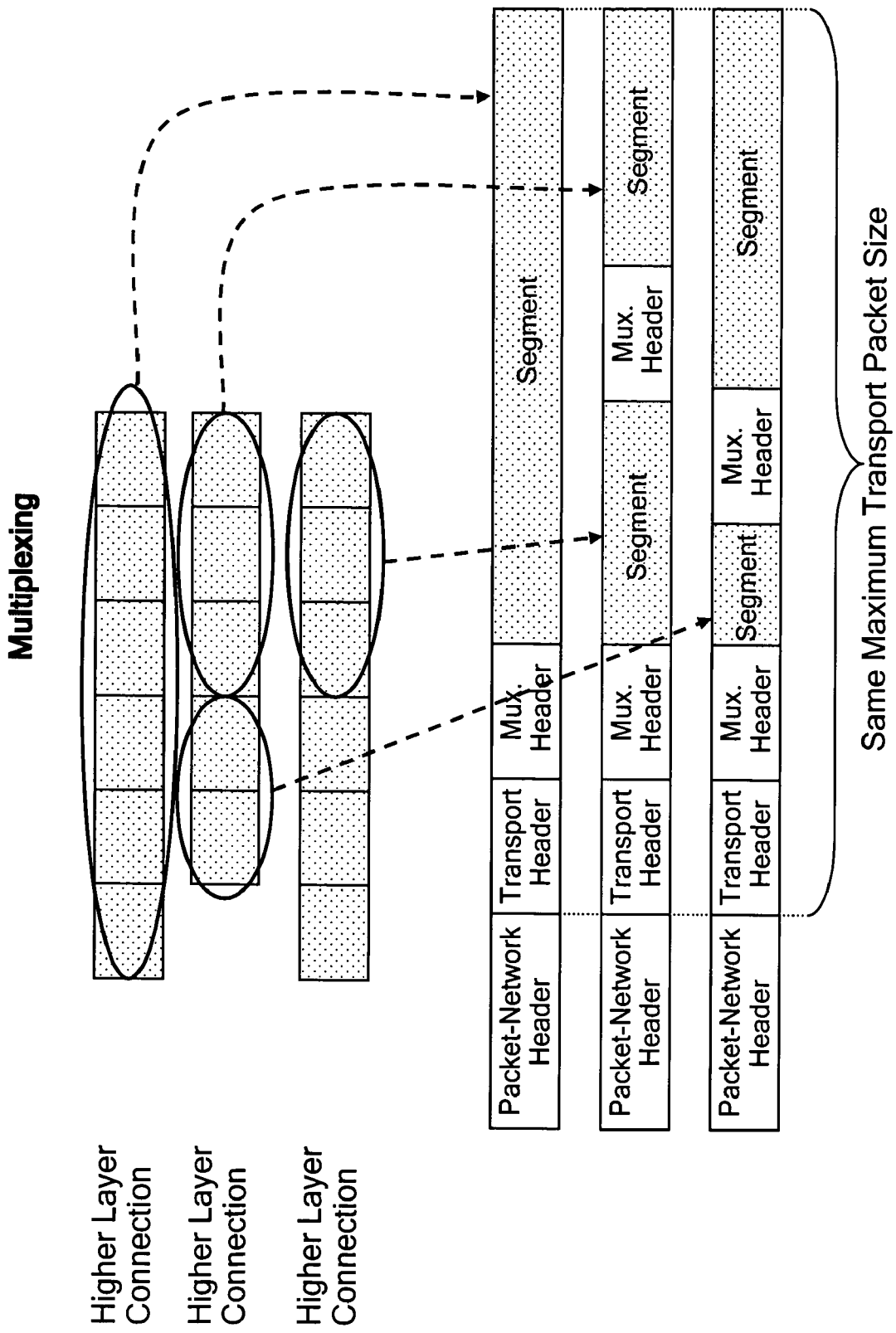
FIG. 3 illustrates a procedure of building transport packets of maximum size using segments from higher layer SDUs from multiple higher layer connections according to an embodiment of the present invention.
Figure 4:
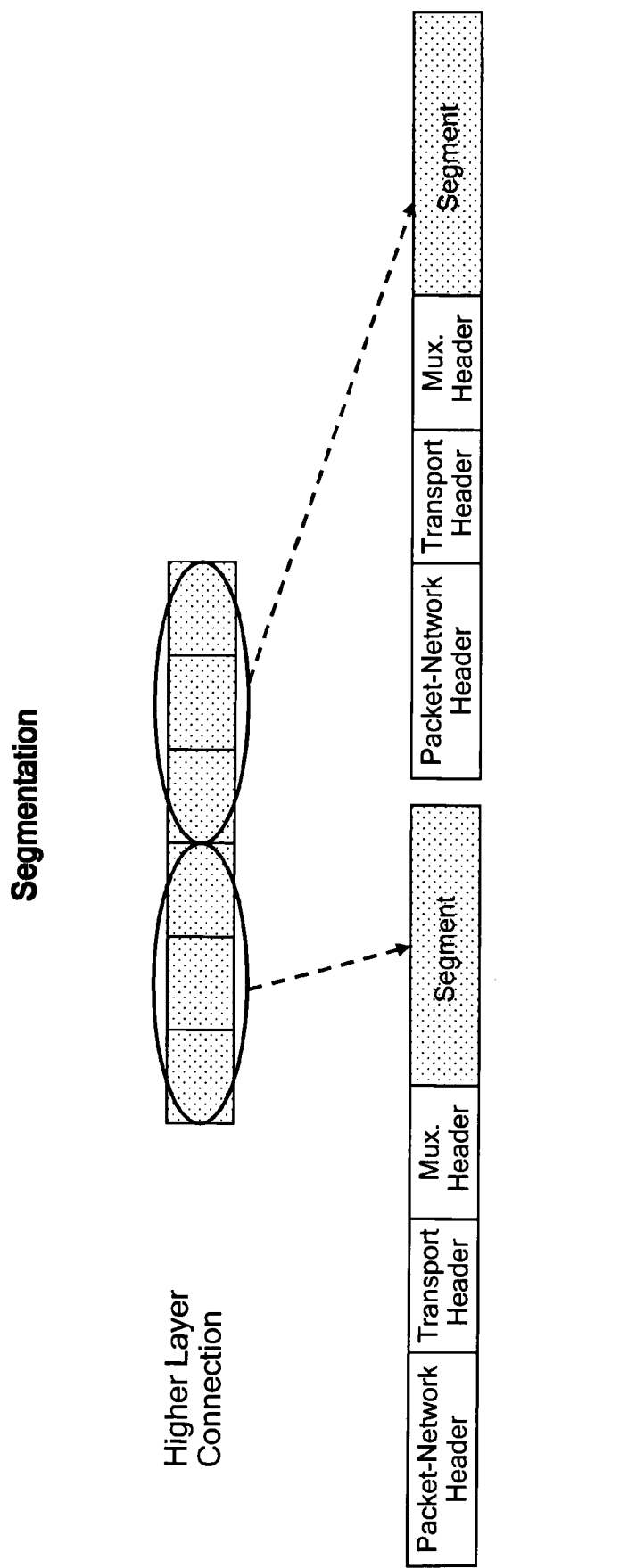
FIG. 4 illustrates a procedure of building several transport packets using segments from a higher layer SDU of one higher layer connection according to an embodiment of the present invention.

FIGS. 3 and 4 illustrate an embodiment of the invention in which the formed transport packets each have the maximum size. FIG. 3 shows multiplexing of segments of several higher layer connections into different transport packets, and multiplexing new formed segments from different higher layer connections in one transport packet. Segments are taken from receiving buffers of these higher layer connections and are included into transport packets as described above, wherein each transport packet has the same maximum transport packet size. As can be seen from FIGS. 2 to 3, the size of each new formed segment to be transported over the packet network may be different.

Moreover, the transport packets may be formed by including segments belonging to a specific data unit into different transport packets which can be seen from FIG. 4. According to FIG. 4, segments of one higher layer connection are transported via two transport packets.

Thus, a transport packet may contain data from one or multiple higher layer connections (e.g. AAL2 connections), separated by multiplex headers. The multiplex payload may contain either a complete higher layer (e.g. AAL2) SDU (FP PDU) frame or only a part of it (i.e. a segment).

Then the complete transport data packet is sent out over the packet-based interface of the IWU 100.

On the receiving side, e.g. the BTS shown in FIG. 1, the segments are buffered for each connection separately. When the last segment of a FP frame has been received (indicated by a special bit in the multiplex header), then the complete frame is given to the next layer for further processing.

Figure 5:
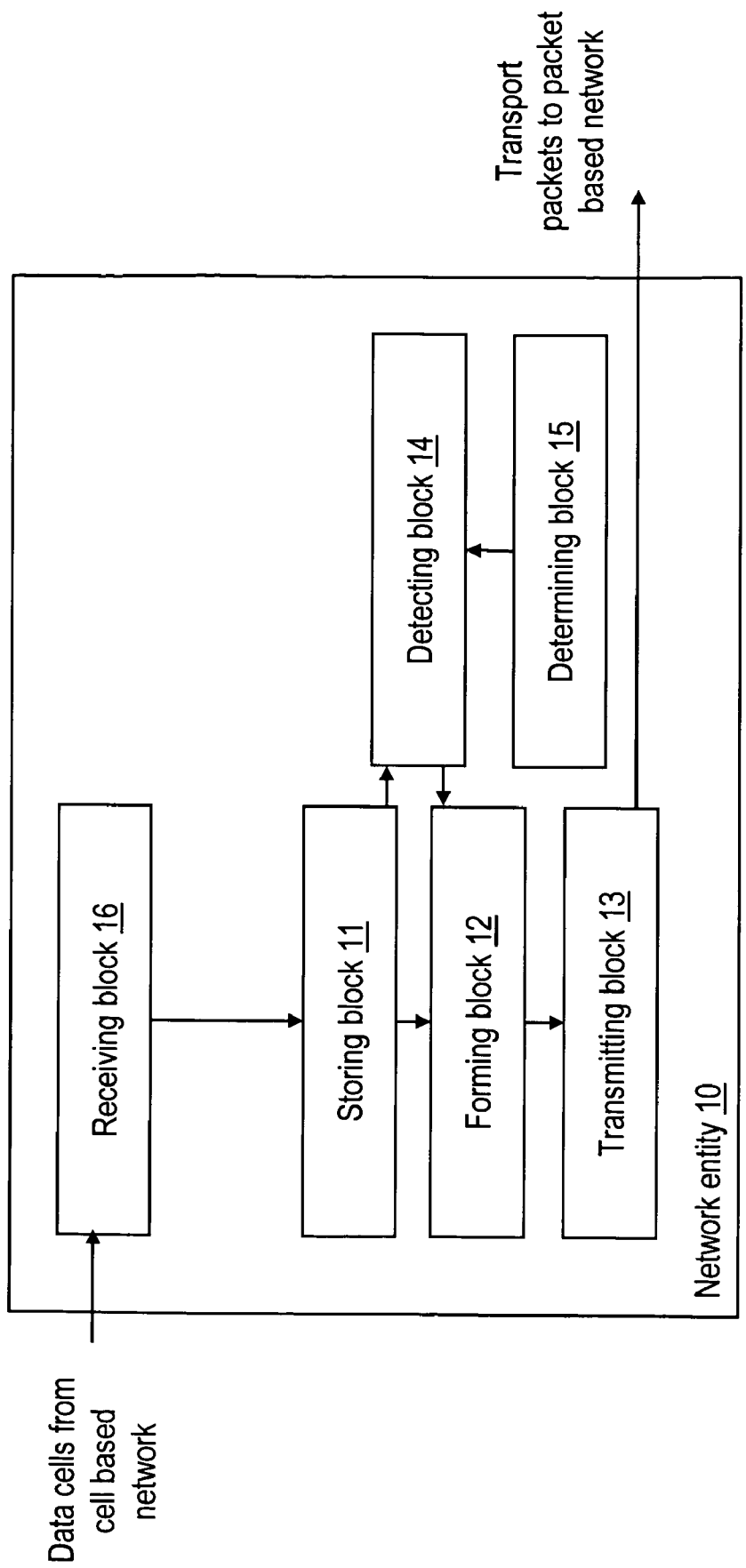
FIG. 5 shows a schematic block diagram illustrating functionality of a network entity 10 according to the invention, interfacing a cell based network and a packet based network, in a direction from the cell based network to the packet based network.

FIG. 5 shows a schematic block diagram illustrating functionality of a network entity 10 such as the IWU 100 in a more general way, the network entity 10 interfacing a cell based network such as an ATM network and a packet based network, in a direction from the cell based network to the packet based network. The network entity 10 shown in FIG. 1 may be part of an Interworking Unit (IWU) or a network node such as an RNC or BTS.

Figure 6:
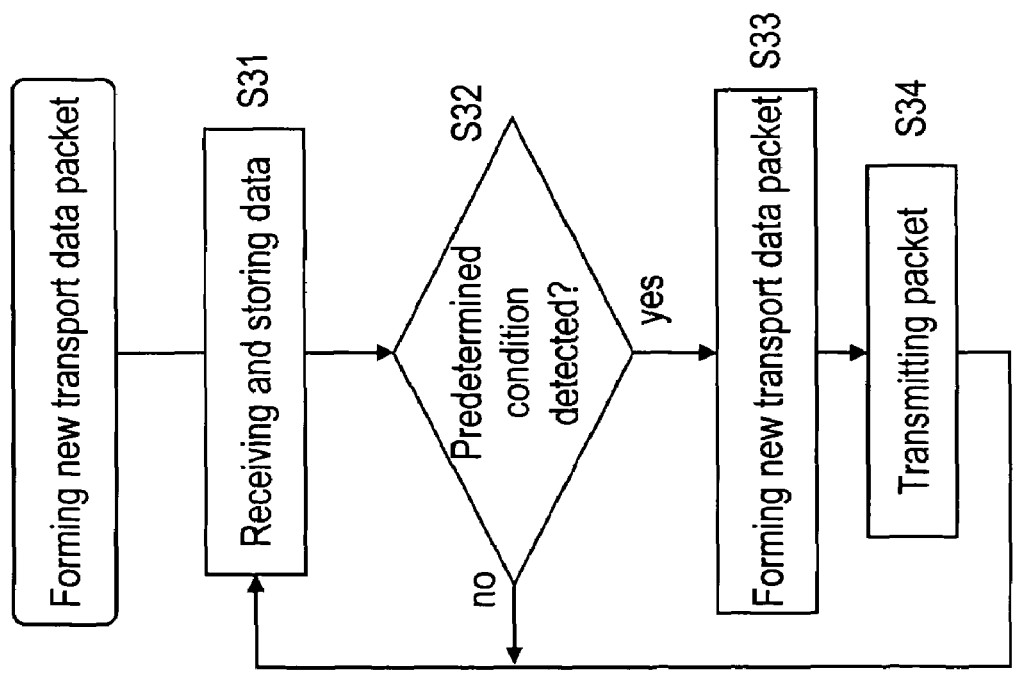
FIG. 6 shows a flow diagram illustrating a process of forming a new transport data packet according to the present invention.

FIG. 6 shows a flow diagram illustrating a process of forming a new transport packet by the network entity 10. The network entity 10 comprises a storing block 11, a forming block 12 and a detecting block 14. The network entity 10 may further comprise a receiving block 16, a transmitting block 13 and a determining block 15.

The storing block 11 stores or temporarily holds segments of higher layer SDUs (e.g. AAL2 CPS packet payload) received by the receiving block 16 from the ATM network (S31).

The forming block 12 is used for forming transport packets out of the segments of service data units stored by the storing block 11. The stored segments of service data units belong to protocol data units (e.g. FP PDUs). The transport packets each have a size equal or less a determined maximum packet size. The forming block 12 forms (S33) a transport packet out of the segments of service data units stored in the storing block 11. The forming block 12 may form the transport packet in response to a predetermined condition detected by the detecting block 14 (S32). The transport packet is formed irrespective of whether a complete service data unit has been received.

The determining block 15 determines the maximum size of the transport packets, e.g. according to link capacities, a delay budget, connection priorities, timer values per AAL2 connection, the Path MTU size (in order to avoid additional IP fragmentation), etc. The calculated maximum packet size is then used by the detecting block 14 to check whether enough data segments are present in the storing block 11 to form a packet with the maximum size, and if enough segments are available to inform the forming means to form the packet. The formed packet is transmitted by the transmitting block 13 to the packet based network (S34).

As mentioned above, the data stored by the storing block 11 may be segments of a higher layer SDU (e.g. segments of an AAL2 service data unit from AAL2 CPS packets), received from an cell based network, and the forming block 12 may form the transport packet in response to the detecting block 14 detecting the at least one predetermined condition.

The predetermined condition used by the detecting block 14 may comprise at least one of the following:
   a timer expires
   a resulting transport packet size would reach the maximum transport packet size.

Thus, the forming block 12 may form the transport packet out of all the data from stored segments of service data units in response to the detecting block 14 detecting a timer expiration, in which case the transport packet size will be less than the maximum size.

In addition, the forming block 12 may form the transport packet out of a maximum amount of data from stored segments of service data units in response to the detecting block 14 detecting the maximum amount of data fitting into the transport packet. In this case the transport packet size will be equal to the maximum size.

Moreover, the forming block 12 may form the transport packets by including data belonging to a specific FP PDU into different transport packets. The forming block 12 may also form the transport packets by including data belonging to different service data units into one transport packet. In this context, the forming block 12 may add an indication to the data out of which the transport packet is formed, the indication indicating a specific service data unit to which the data belongs.

According to FIG. 6, a new transport packet is formed by the network entity 10 and transmitted to the packet based network.

Processing in the other direction, i.e. from a network node of the packet based network via the interworking unit (e.g. from the BTS to the IWU 100 as shown in FIG. 1) to the cell based network is done similarly. However, on the sending side the complete FP frames may be given in one piece to the segmentation/multiplexing and transport layers. In the segmentation/multiplexing and transport layers transport packets are formed as described above, by dividing the FP PDU into one or multiple segments. In addition it is also possible to multiplex several smaller FP PDUs into a single transport packet. The complete transport data packet is then sent to the interworking unit (e.g. the IWU 100).

Figure 7:
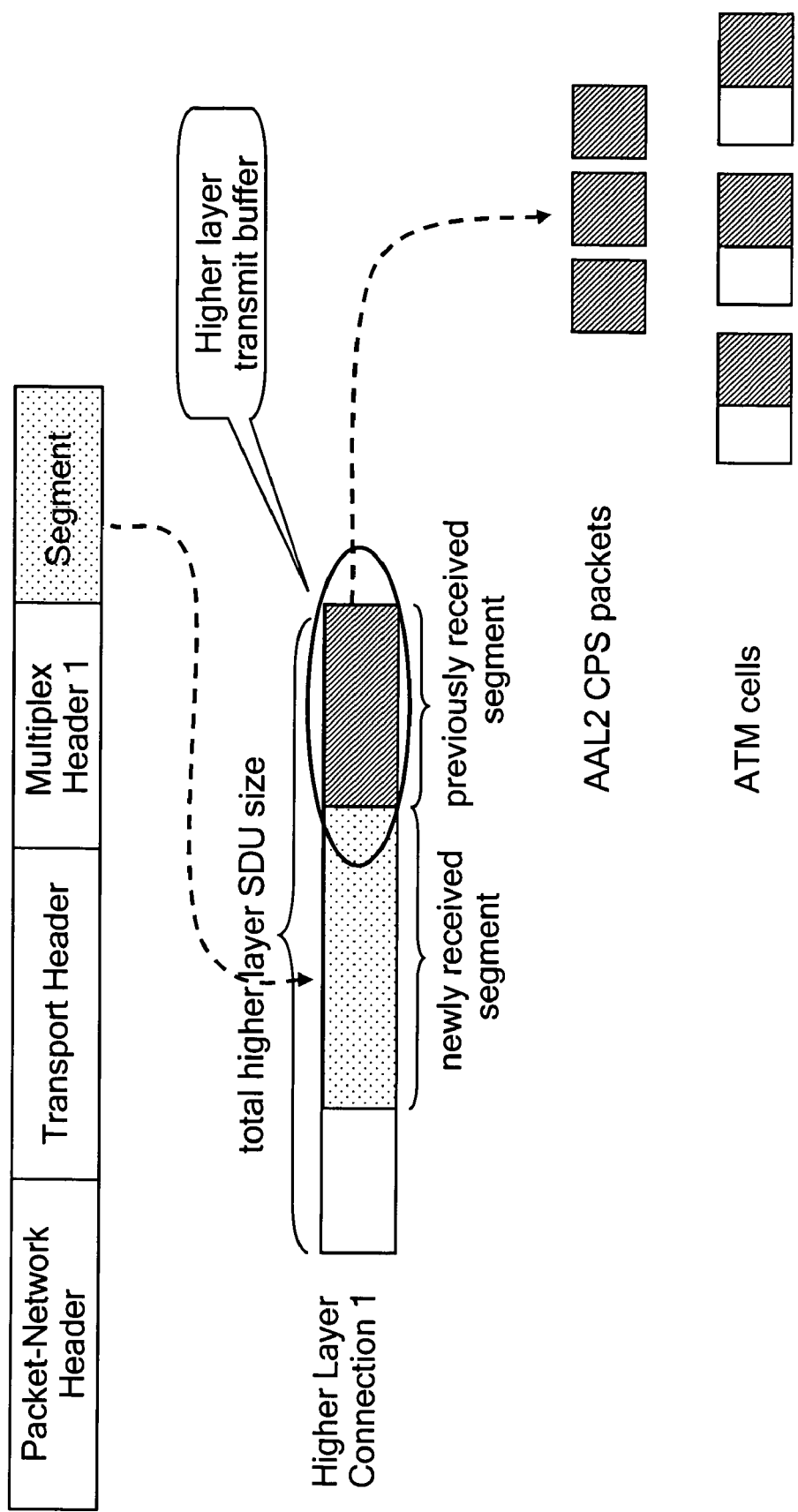
FIG. 7 illustrates a procedure of building ATM cells of higher layer SDUs from transport packet segments according to an embodiment of the present invention.

At the IWU 100 the segments are removed from the transport packet and stored in an AAL2 SDU (FP PDU) transmit buffer for each AAL2 connection separately. FIG. 7 shows this segmentation procedure. A segment from a transport packet belonging to a higher layer connection 1 is held in a transmit buffer for the higher layer connection 1. As soon as enough data to fill at least one AAL2 CPS packet is available in the transmit buffer of the higher layer connection 1, or the last segment of a FP PDU is received, the AAL2 SSSAR function starts to segment the AAL2 SDU (FP PDU) into CPS packets and send them out over the ATM interface as shown in FIG. 11.

Figure 8:
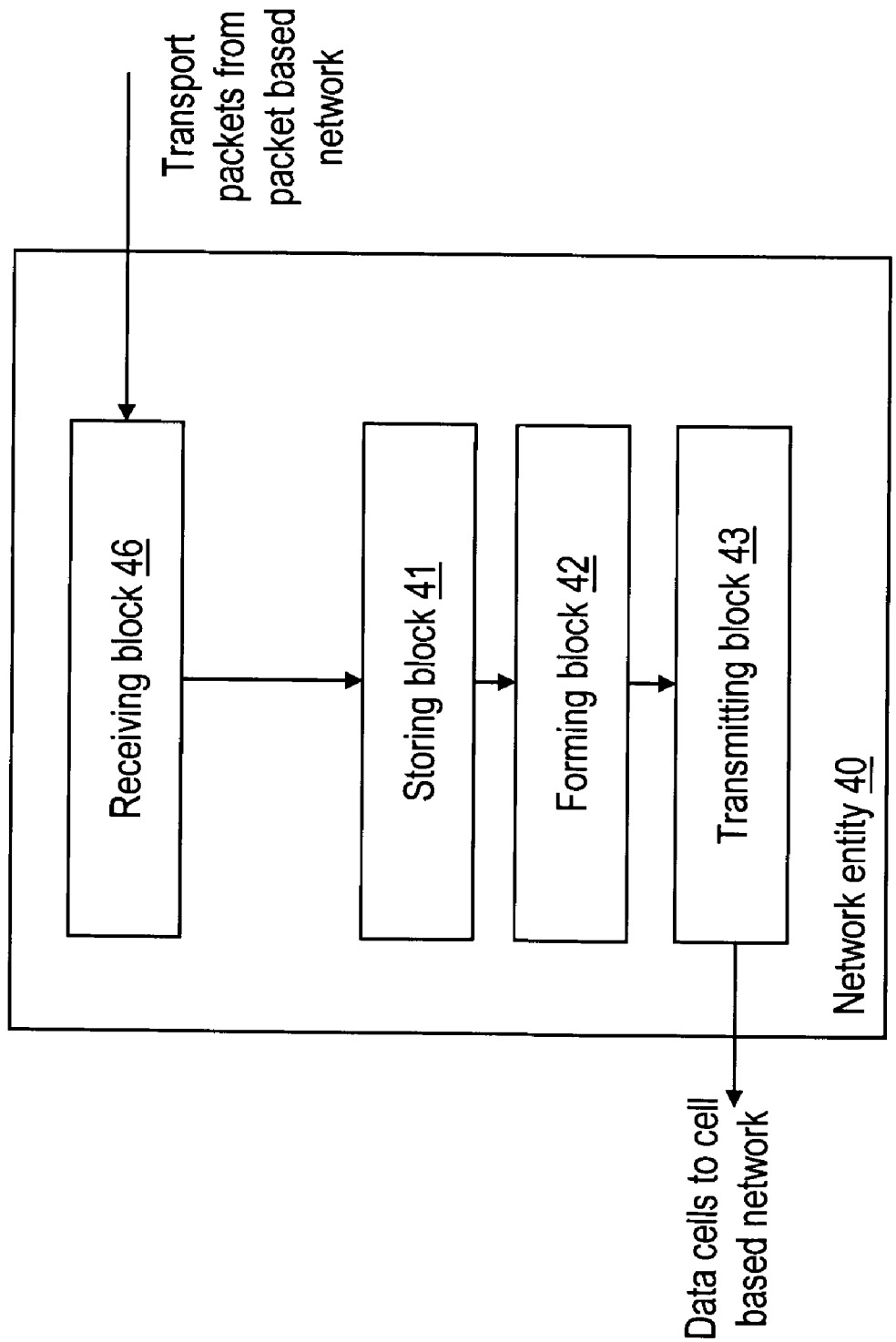
FIG. 8 shows a schematic block diagram illustrating functionality of the network entity 40 according to the invention, in a direction from the packet based network to the cell based network.

FIG. 8 shows a schematic block diagram illustrating functionality of a network entity 40 according to the invention, in the direction from the packet based network to the cell based network. The functionality of the network entity 40 may be contained in the IWU 100 as described above. The network entity 40 comprises a storing block 41, a forming block 42, a transmitting block 43 and a receiving block 46.

Figure 9:
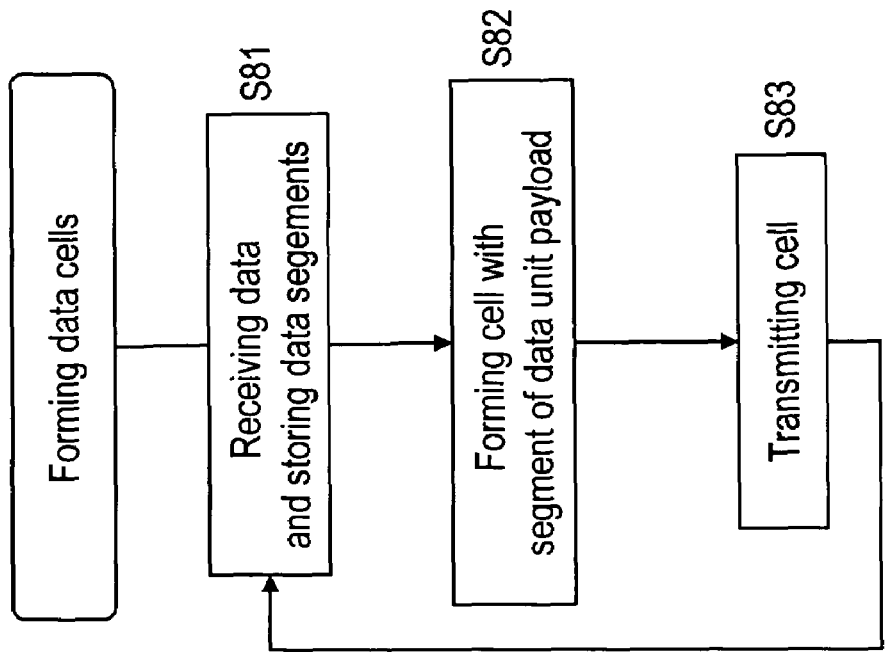
FIG. 9 shows a flow diagram illustrating a process of forming cells carrying segments of data units according to the present invention.

FIG. 9 shows a flow diagram illustrating a process of forming cells (segments of data units) by the network entity 40.

The storing block 41 stores or temporarily holds data from transport packets received from the packet based network (S81), the transport packets comprising segments of FP PDUs. The forming block 42 forms cells (e.g. ATM cells) out of the segments extracted from the transport data packets and stored in the storing block 41.

Segments are removed from the transport packets and may be stored in a section of the storing block 41 acting as higher layer SDU transmit buffer (S81). According to ATM, the AAL2 SSSAR function (which is part of the forming block 42) segments the AAL2 SDU (FP PDU) into CPS packets and the CPS packets are packed into ATM cells (S82), which are then sent (S83) by the transmitting block 43 over the ATM interface as shown in FIG. 11. The forming of CPS packets to be sent over the ATM interface can be done even before the complete AAL2 SDU has been received. More generally speaking, the forming of segments to be sent over the cell based interface can be done even before the complete higher layer SDU has been received.

FIG. 10 shows a flow chart generally illustrating the communication of data between a packet based network and a cell based network according to the present invention. In a first step S61, segments of data units are received. These segments may be segments distributed over a plurality of packets from the packet based network, and/or segments distributed over a plurality of cells from the cell based network.

In step S62, new data segments are formed out of the received segments of the data units, and in step S63 the new data segments are transmitted, wherein the new data segments are transmitted irrespective of whether a complete data unit has been received.

The above described functionalities of the network entity 10/40 may also be implemented as computer programs running in an Interworking Unit, BTS and/or RNC.

According to the present invention, a method and apparatus for communicating data between a cell based network and a packet based network are provided. Received segments of a service data unit which are extracted from a cell based network interface and belong to protocol data units, are formed into transport packets, regardless of whether a complete protocol data unit has been received.

Moreover, received segments of transport packets, which are extracted from a packet based network interface and belong to protocol data units, are formed into service data units, regardless of whether a complete protocol data unit has been received.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. An apparatus, comprising:
   a receiver configured to receive segments of data units from a cell based network, wherein the data units are data units of a higher layer of the cell based network, and wherein the higher layer of the cell based network terminates at the apparatus;
   a processor configured to form transport packets out of the segments of the data units irrespective of whether a complete data unit has been received, using a segmentation/reassembly and multiplexing/demultiplexing layer of the apparatus which is introduced on top of a transport layer of the apparatus,
   wherein the segmentation/reassembly and multiplexing/demultiplexing layer is configured to add an indication to a segment out of the segments received, the indication configured to indicate a specific data unit to which the segment belongs, and put the segment with the indication into a transport packet to be transmitted to a packet based network,
   wherein the segmentation/reassembly and multiplexing/demultiplexing layer is configured to repeat these processes for each of the segments received, thereby forming the transport packets; and
   a transmitter configured to transmit the transport packets to the packet based network.

2. The apparatus according to claim 1, wherein the cell based network comprises an asynchronous transfer mode network.

3. The apparatus according to claim 1, wherein the packet based network comprises Ethernet.

4. The apparatus according to claim 1, wherein the receiver is configured to receive segments of data units from the packet based network,
   wherein the segments of data units received are distributed over a plurality of packets from the packet based network, and
   wherein the apparatus further comprises:
   a storage configured to temporarily store received segments,
   wherein the processor is configured to form cells, and
   wherein the transmitter is configured to transmit the cells formed by the processor to the cell based network.

5. The apparatus according to claim 1, wherein the segments of data units received by the receiver are segments distributed over a plurality of cells from the cell based network, and wherein the apparatus further comprises:
   a storage configured to temporarily store received segments.

6. The apparatus according to claim 5, wherein the processor is further configured to detect conditions to be fulfilled in order to build a transport packet out of stored segments from the storage.

7. The apparatus according to claim 6, wherein the processor is further configured to detect a timer expiration as one of the conditions.

8. The apparatus according to claim 6, wherein the processor is further configured to detect that a number of received segments reaches a maximum size of the transport packets as one of the conditions.

9. The apparatus according to claim 8, wherein the processor is further configured to determine a maximum size of the transport packets.

10. The apparatus according to claim 5, wherein the transport packets each have a same maximum size.

11. The apparatus according to claim 5, wherein the segmentation/reassembly and multiplexing/demultiplexing layer is further configured to form the transport packets by including segments belonging to a specific data unit into different transport packets.

12. The apparatus according to claim 5, wherein the segmentation/reassembly and multiplexing/demultiplexing layer is further configured to form the transport packets by including segments belonging to different data units into one transport packet.

13. The apparatus according to claim 1, wherein the apparatus comprises a base station.

14. The apparatus according to claim 1, wherein the apparatus comprises an interworking unit.

15. The apparatus according to claim 1, wherein the apparatus comprises a radio network controller.

16. A method for an apparatus, comprising:
receiving segments of data units from a cell based network, wherein the data units are data units of a higher layer of the cell based network, and wherein the higher layer of the cell based network terminates at the apparatus;
forming transport packets out of the segments of the data units irrespective of whether a complete data unit has been received, using a segmentation/reassembly and multiplexing/demultiplexing layer of the apparatus, which is introduced on top of a transport layer of the apparatus,
wherein the segmentation/reassembly and multiplexing/demultiplexing layer adds an indication to a segment out of the segment received, the indication indicating a specific data unit to which the segment belongs, and puts the segment with the indication into a transport packet to be transmitted to a packet based network,
wherein the segmentation/reassembly and multiplexing/demultiplexing layer repeats these processes for each of the segments received, thereby forming the transport packets; and
transmitting the transport packet to a packet based network.

17. The method of claim 16, comprising:
receiving segments of data units from the packet based network, wherein the segments are distributed over a plurality of packets from the packet based network, and wherein the method further comprises:
temporarily storing received segments,
forming cells, and
transmitting the cells to the cell based network.

18. The method according to claim 16, wherein the segments of data units received are segments distributed over a plurality of cells from the cell based network, and wherein the method further comprises:
temporarily storing received segments.

19. The method according to claim 18, further comprising:
detecting conditions to be fulfilled in order to build a transport packet out of stored segments.

20. The method according to claim 19, wherein the detecting comprises detecting a timer expiration as one of the conditions.

21. The method according to claim 19, wherein the detecting comprises detecting that a number of received segments reaches a maximum size of the transport packets as one of the conditions.

22. The method according to claim 21, further comprising:
determining a maximum size of the transport packets.

23. The method according to claim 18, wherein the transport packets each have a same maximum size.

24. The method according to claim 18, wherein the forming of the transport packets comprises forming the transport packets by including segments belonging to a specific data unit into different transport packets.

25. The method according to claim 18, wherein the forming of the transport packets comprises forming the transport packets by including segments belonging to different data units into one transport packet.

26. A computer program embodied in a computer-readable medium, the computer program configured to control a processor to perform operations comprising:
receiving segments of data units from a cell based network, wherein the data units are data units of a higher layer of the cell based network, and wherein the higher layer of the cell based network terminates at the apparatus;
forming transport packets out of the segments of the data units irrespective of whether a complete data unit has been received, using a segmentation/reassembly and multiplexing/demultiplexing layer of the apparatus which is introduced on top of a transport layer of the apparatus,
wherein the segmentation/reassembly and multiplexing/demultiplexing layer adds an indication to a segment out of the segments received, the indication indicating a specific data unit to which the segment belongs and puts the segment with the indication into a transport packet to be transmitted to a packet based network,
wherein the segmentation/reassembly and multiplexing/demultiplexing layer repeats these processes for each of the segments received, thereby forming the transport packets; and
transmitting the transport packets to the packet based network.

27. The computer program according to claim 26, wherein the computer program is directly loadable into an internal memory of a computer.

28. An apparatus, comprising:
receiving means for receiving segments of data units from a cell based network, wherein the data units are data units of a higher layer of the cell based network, and wherein the higher layer of the cell based network terminates at the apparatus;
forming means for forming transport packets out of the segments of the data units irrespective of whether a complete data unit has been received, using a segmentation/reassembly and multiplexing/demultiplexing layer of the apparatus which is introduced on top of a transport layer of the apparatus,
wherein the segmentation/reassembly and multiplexing/demultiplexing layer is configured to add an indication to a segment out of the segments received, the indication configured to indicate a specific data unit to which the segment belongs, and put the segment with the indication into a transport packet to be transmitted to a packet based network,
wherein the segmentation/reassembly and multiplexing/demultiplexing layer is configured to repeat these processes for each of the segments received, thereby forming the transport packets; and
transmitting means for transmitting the transport packets to the packet based network.

* * * * *

UNITED STATES PATENT AND TRADEMARK OFFICE
CERTIFICATE OF CORRECTION

PATENT NO. : 7,609,702 B2 Page 1 of 1
APPLICATION NO. : 11/086557
DATED : October 27, 2009
INVENTOR(S) : Tamas Major It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1048 days.

Signed and Sealed this

Twelfth Day of October, 2010

David J. Kappos
*Director of the United States Patent and Trademark Office*